United States Patent [19]

Garcia et al.

[11] 3,763,322

[45] Oct. 2, 1973

[54] DIGITAL-TO-TONE CONVERTER UTILIZING A RELAXATION OSCILLATOR

[75] Inventors: Hernando Javier Garcia, San Francisco, Calif.; Benjamin Roger Peek, Garland, Tex.

[73] Assignee: Integrated Systems Technology, Inc., Garland, Tex.

[22] Filed: Oct. 1, 1971

[21] Appl. No.: 185,745

[52] U.S. Cl. ............ 179/41 A, 179/16 EC, 331/111

[51] Int. Cl. ............................................. H04b 7/00

[58] Field of Search ........... 179/2 DP, 16 R, 16 EC, 179/41 A, 84 VF, 15 BZ; 325/111, 117, 184; 328/127; 331/111, 113, 143

[56] References Cited

UNITED STATES PATENTS

| | | | |
|---|---|---|---|
| 3,656,066 | 4/1972 | Reynal | 331/111 |
| 3,605,021 | 9/1971 | Mychalowych | 325/320 |
| 3,651,267 | 3/1972 | Wittenberger | 170/2 DP |
| 3,627,949 | 12/1971 | Krecic et al. | 179/2 DP |
| 3,573,664 | 4/1971 | Jacob | 331/143 |
| 3,510,592 | 5/1970 | Menicou | 179/2 DP |
| 3,336,444 | 8/1967 | Piechocki | 179/41 A |

*Primary Examiner*—Kathleen H. Claffy
*Assistant Examiner*—Randall P. Myers
*Attorney*—Jack A. Kanz

[57] ABSTRACT

A relaxation oscillator is formed by a Schmitt trigger circuit and an operational integrator circuit interconnected to form an oscillatory feedback loop. A diode switching network is constructed to receive a plural-bit digital input signal and to modify a circuit parameter in the oscillator feedback loop to adjust the frequency of oscillation in accordance with the coding of the digital input signal. An active low-pass filter circuit is connected to the output of the operational integrator circuit and supplies a sinusoidal tone signal to an output circuit. A switching circuit is responsive to the digital input signal for disabling the output circuit except during the occurrence of predetermined digital code values.

12 Claims, 2 Drawing Figures

DIGITAL-TO-TONE CONVERTER UTILIZING A RELAXATION OSCILLATOR

BACKGROUND OF THE INVENTION

This invention relates to digital-to-tone converters for converting digital signals into audio-frequency tone signals.

There are various applications wherein it is desired to transmit digital data signals, digital control signals and the like in the form of audio-frequency tone signals. One example is the case of some newly developed portable radio telephone equipment designed for use in vehicular, marine band, air-to-ground and intercom type telephone communications systems. In a vehicular system, for example, there is provided a portable telephone mobile unit which cooperates with a telephone company radio telephone base station for purposes of connecting the mobile unit to the telephone company land line telephone system or to another radio telephone mobile unit or the like. Such portable telephone mobile unit accomplishes various connect, disconnect and automatic dialing functions by transmitting digital control signals to the base station with such control signals being transmitted as audio-frequency tone signals which modulate the radio-frequency carrier signal transmitted by the mobile unit. In applications such as this, the mobile unit digital-to-tone converter which produces the audio-frequency tone signals should provide stable and reliable operation with a minimum of circuit complexity. Such converter should also be of relatively low cost. Unfortunately, the various digital-to-tone converters heretofore proposed leave something to be desired in terms of meeting these objectives.

It is an object of the invention, therefore, to provide a new and improved digital-to-tone converter which provides stable and reliable performance at a relatively low cost.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENT

Figure 1:
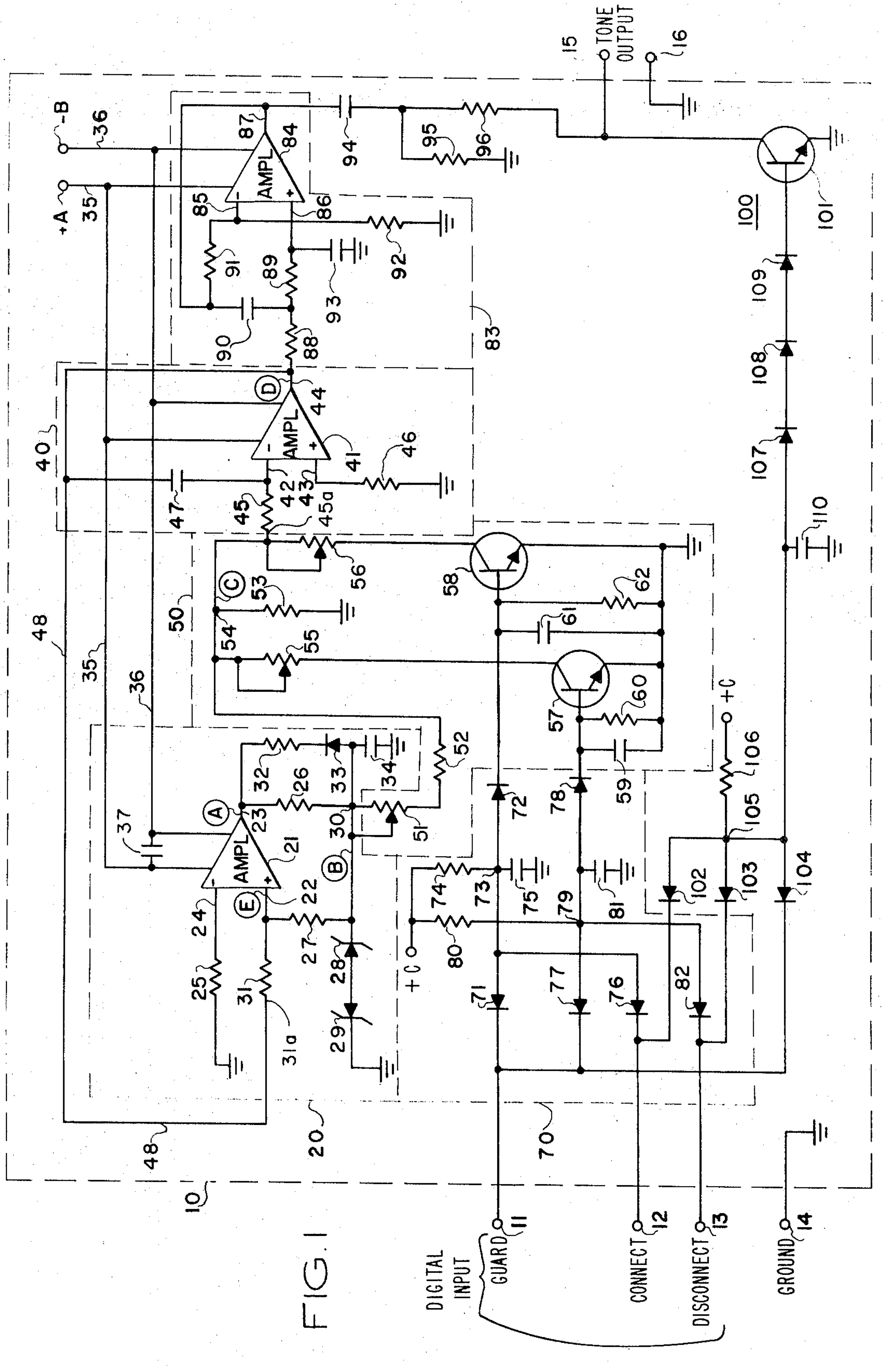
FIG. 1 is a schematic circuit diagram of a digital-to-tone converter constructed in accordance with the present invention.

Referring to FIG. 1, there is shown a digital-to-tone converter 10 having a plurality of input terminals 11–14 for receiving a plural-bit parallel-type digital input signal and having a pair of output terminals 15 and 16 for providing thereat an audio-frequency tone signal the frequency of which is controlled by the coding of the plural-bit digital input signal. For sake of example only, the digital-to-tone converter 10 will be described for the case where it is to be used in vehicular-type portable radio telephone mobile equipment. For this reason, the input terminals 11–13 will be referred to as the guard, connect and disconnect terminals, respectively, this being the terminology currently employed by the telephone company to describe the different audio-frequency tone signals to which the telephone company automatic dial base station equipment is constructed to respond. Input terminal 14 is a common ground terminal and is connected to circuit ground within the converter 10. The frequencies currently employed in the telephone company automatic dial system for the guard, connect and disconnect tones are 2150, 1633 and 1336 hertz, respectively. Thus, depending on the coding of the digital signals at input terminals 11–13, the audio-frequency tone signal appearing at output terminals 15 and 16 will be at one of these three frequencies with the exception that there will be times when the converter 10 is disabled so that no tone signal appears at output terminals 15 and 16.

The digital-to-tone converter 10 includes relaxation oscillator circuit means formed by level sensitive bistable circuit means and integrator circuit means with said bistable circuit means forming a feedback loop for said integrator circuit means. In the present embodiment, the level sensitive bistable circuit means takes the form of a Schmitt trigger circuit 20 which includes a high-gain differential amplifier 21 having a non-inverting input terminal 22, an output terminal 23 and an inverting input terminal 24. Inverting input terminal 24 is connected to circuit ground by way of a resistor 25. Since no signals are supplied to this inverting input terminal 24, amplifier 21 behaves like an ordinary high-gain amplifier of the non-inverting type. Schmitt trigger circuit 20 also includes a pair of feedback resistors 26 and 27 connected in series between the output terminal 23 and the non-inverting input terminal 22 of the amplifier 21. A pair of Zener diodes 28 and 29 are connected in series in an opposite polarity manner between a point 30 intermediate the feedback resistors 26 and 27 and circuit ground. For sake of explanation, point 30 can be considered as being the output terminal point for the Schmitt trigger circuit 20. One terminal 31*a* of an input resistor 31 is taken as being the input terminal for the Schmitt trigger circuit 20, the other terminal of such input resistor 31 being connected to the non-inverting input terminal 22 of amplifier 21. A resistor 32 and a diode 33 are connected in series between the amplifier output terminal 23 and the circuit junction point 30. A capacitor 34 is connected between the junction point 30 and circuit ground. Positive and negative polarity direct-current operating voltages +A and −B are supplied to the amplifier 21 by way of supply voltage conductors 35 and 36, respectively. A filter capacitor 37 is connected between conductors 35 and 36.

The integrator circuit means of the illustrated embodiment takes the form of an operational integrator circuit 40 which includes a high-gain differential amplifier 41 having an inverting input terminal 42, a non-inverting input terminal 43 and an output terminal 44. An input resistor 45 is connected to the inverting input terminal 42, while the non-inverting input terminal 43 is connected to circuit ground by way of a resistor 46. Thus, amplifier 41 is used as an inverting type amplifier. A feedback capacitor 47 is connected between the output terminal 44 and the inverting input terminal 42. Direct-current operating voltages are supplied to the amplifier 41 from supply voltage conductors 35 and 36.

The relaxation oscillator also includes feedback circuit means coupling the output of the integrator circuit 40 to the input of the Schmitt trigger circuit 20. In the present embodiment, this feedback circuit means is represented by a conductor 48 having one end connected to the output terminal 44 of the integrator circuit amplifier 41 and having the other end connected to the input side 31a of the input resistor 31 of the Schmitt trigger circuit 20.

The relaxation oscillator further includes adjustable impedance means 50 coupling the output point 30 of the Schmitt trigger circuit 20 to the input of the operational integrator circuit 40. This adjustable impedance means 50 includes a resistor network which includes a plurality of resistors 51, 52 and 53 connected in series between the output point 30 of Schmitt trigger circuit 20 and circuit ground. The input end 45a of the input resistor 45 of the operational integrator circuit 40 is connected to a circuit point 54 intermediate the two series-connected resistors 52 and 53. Resistor 51 is of the adjustable resistance type. The resistor network portion of the adjustable impedance means 50 further includes a plurality of additional resistors 55 and 56 each having one terminal thereof connected to the circuit point 54 intermediate the two series-connected resistors 52 and 53.

The adjustable impedance means 50 further includes a plurality of switching devices connected to the resistor network 51–56 for modifying the attenuation factor between the output point 30 of Schmitt trigger circuit 20 and the input side 45*a* of input resistor 45 of the operational integrator circuit 40. These switching devices are comprised of a plurality of transistors 57 and 58, each connected in series by its emitter and collector electrodes between the other terminal of one of the additional resistors 55 and 56 and circuit ground. A capacitor 59 and a resistor 60 are connected in parallel between the base electrode of the transistor 57 and circuit ground. A capacitor 61 and a resistor 62 are connected in parallel between the base electrode of transistor 58 and circuit ground.

The digital-to-tone converter 10 further includes control circuit means coupled to the oscillator circuit and responsive to the plural-bit digital input signal appearing at input terminals 11-13 for modifying a circuit parameter in the oscillator feedback loop for adjusting the frequency of oscillation in accordance with the coding of the digital input signal. This control circuit means is comprised of a decoder network 70 which is coupled to the resistor network switching devices represented by transistors 57 and 58 for controlling the voltage dividing action of resistor network 51–56 in accordance with the coding of the digital input signal at input terminals 11–13. In the present embodiment, decoder network 70 takes the form of a diode switching network which includes diodes 71 and 72 connected in series in an opposite polarity manner between digital signal input terminal 11 and the base electrode of transistor 58. A circuit point 73 intermediate diodes 71 and 72 is connected by way of a resistor 74 to a positive polarity direct-current voltage source +C. A capacitor 75 is connected between circuit point 73 and circuit ground. A further diode 76 is connected between the second digital signal input terminal 12 and the circuit point 73 intermediate diodes 71 and 72. Elements 71-76 control the operation of transistor 58.

Decoder network or diode switching network 70 further includes a pair of diodes 77 and 78 connected in series in an opposite polarity manner between the digital signal input terminal 11 and the base electrode of the other switching network transistor 57. A circuit point 79 intermediate diodes 77 and 78 is connected by way of a resistor 80 to the positive direct-current voltage source +C. A capacitor 81 is connected between the circuit point 79 and circuit ground, while an additional diode 82 is connected between circuit point 79 and the third digital signal input terminal 13. Elements 77–82 control the operation of transistor 57.

The digital-to-tone converter 10 also includes filter circuit means responsive to the oscillatory signal appearing at the output 44 of the operational integrator circuit 40 for producing a sinusoidal signal of the same frequency. This filter circuit means is comprised of an active low-pass filter 83 which includes a high-gain differential amplifier 84 having an inverting input terminal 85, a non-inverting input terminal 86 and an output terminal 87. Resistors 88 and 89 are connected in series between the output terminal 44 of integrator amplifier 41 and the non-inverting input terminal 86 of filter circuit amplifier 84. A capacitor 90 is connected between the output terminal 87 of amplifier 84 and a point intermediate resistors 88 and 89. Resistors 91 and 92 are connected in series between the amplifier output terminal 87 and circuit ground, a point intermediate resistors 91 and 92 being connected to the inverting input 85 of amplifier 84. A capacitor 93 is connected between the non-inverting input terminal 86 of amplifier 84 and circuit ground. Direct-current operating voltage for the amplifier 84 is supplied thereto from the supply voltage conductors 35 and 36. Resistor and capacitor elements 88–93 are proportioned to provide a low-pass frequency response characteristic for the filter circuit 83. For the above-indicated telephone company signalling tone frequencies, the filter circuit 83 may be constructed so that the frequency response characteristic begins to roll off for the higher frequencies such that the response is three decibels down at a frequency of approximately 2800 hertz.

The tone-to-digital converter 10 further includes an output circuit for supplying the sinusoidal signal appearing at the output of filter circuit 83 to another circuit which is connected to the converter output terminals 15 and 16 for purposes of utilizing such tone signal. This output circuit includes a coupling capacitor 94, resistors 95 and 96 and output terminals 15 and 16. Resistor 96 is connected in series between the capacitor 94 and the output terminal 15, while resistor 95 is connected to a circuit point intermediate capacitor 94 and resistor 96 and circuit ground.

The tone-to-digital converter 10 also includes a switching circuit 100 responsive to the digital input signal at input terminals 11-13 for disabling the output circuit represented by elements 94–96 except during the occurrence of predetermined digital code values at such input terminals 11–13. This switching circuit 100 includes a transistor 101 having its collector connected to converter output terminal 15 and its emitter connected to circuit ground. The base electrode of transistor 101 is coupled to a diode switching network which is, in turn, coupled to the digital signal input terminals 11–13. This diode switching network includes diodes 102, 103 and 104, the cathodes of which are connected to the digital signal input terminals 12, 13 and 11, respectively. The anodes of diodes 102, 103 and 104 are connected to a circuit point 105 which is, in turn, connected by way of a resistor 106 to a positive polarity direct-current voltage source +C. Circuit point 105 is connected by way of series-connected diodes 107, 108 and 109 to the base electrode of the transistor 101. A capacitor 110 is connected between the circuit point 105 and circuit ground.

OPERATION OF THE ILLUSTRATED EMBODIMENT

Figure 2:
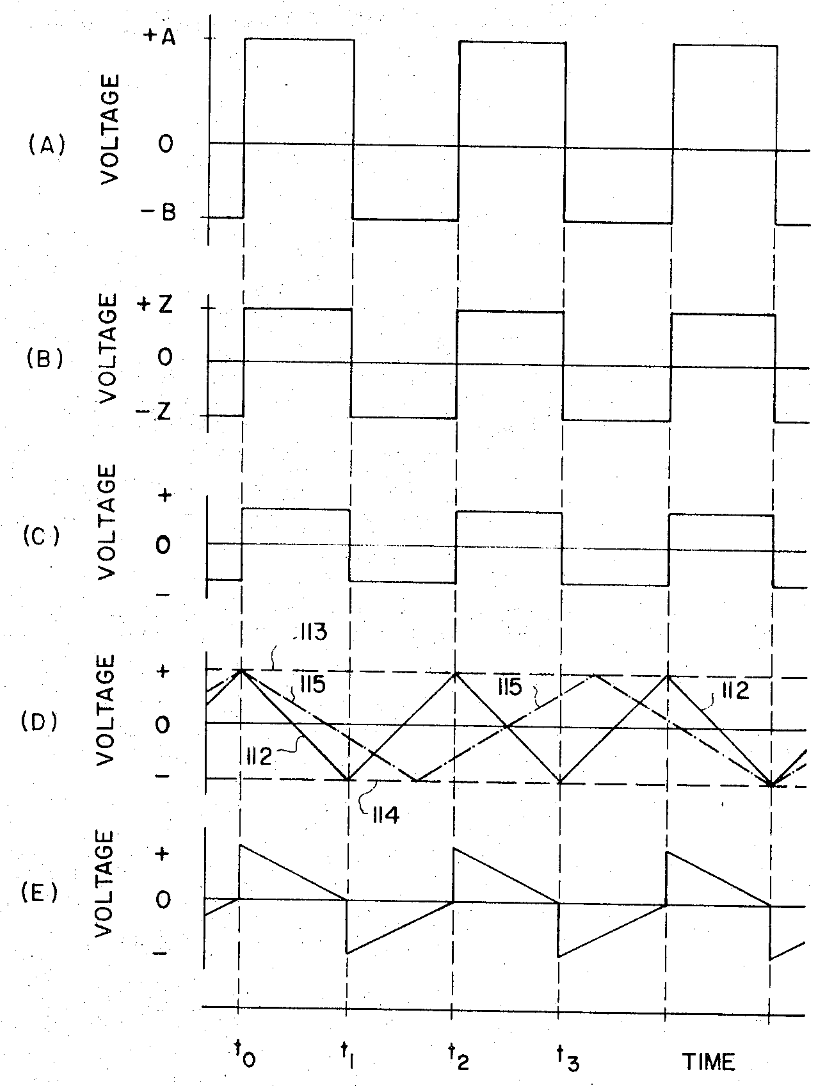
FIG. 2 is a graph showing typical waveforms for electrical signals appearing at different points in the circuit depicted in FIG. 1.

Considering now the operation of the digital-to-tone converter 10, there will first be described the operation of the relaxation oscillator formed by the Schmitt trigger circuit 20, the operational integrator circuit 40 and the circuit connections therebetween. It will be assumed for the moment that transistors 57 and 58 are non-conductive. FIG. 2 shows typical waveforms for signals appearing at various points in the oscillator circuit. Waveform A shows a typical signal appearing at the output terminal 23 of amplifier 21 in the Schmitt trigger circuit 20. Such signal is a square wave signal which alternates back and forth between the +A and −B supply voltage levels. In the present embodiment, +A is greater than −B and, as a consequence, the positive half cycles in waveform A are of greater amplitude than the negative half cycles. This asymmetrical square wave signal is clipped and regulated by the Zener diodes 28 and 29 to produce at the Schmitt trigger circuit output point 30 a symmetrical square wave signal of the form represented by waveform B. This signal varies between regulated +Z and −Z voltage levels, where Z denotes the reverse voltage breakover level of each of the Zener diodes 28 and 29.

During the positive half cycles of waveform A, diode 33 is non-conductive and current flows by way of resistor 26 and Zener diodes 28 and 29 to circuit ground. During the negative half cycles of waveform A, diode 33 is conductive which, in effect, connects resistor 32 in parallel with resistor 26. Resistor 32 is of lower value than resistor 26. This decreases the net resistance in series with the Zener diodes 28 and 29 so that the same magnitude of current will flow through Zener diodes 28 and 29 during the smaller amplitude negative half cycles as flows through such Zener diodes during the larger amplitude positive half cycles. This minimizes any difference in the regulated +Z and −Z levels at the circuit output point 30.

The regulated square wave signal (waveform B) appearing at Schmitt trigger output point 30 is divided down by the voltage divider formed by resistor network resistors 51, 52 and 53 to produce a reduced amplitude replica thereof at the input side **45*a* of input resistor 45 of the operational integrator circuit 40. This reduced amplitude square wave signal is represented by waveform C of FIG. 2**, it being noted that, for simplicity of illustration, the amplitude scale of waveform C is enlarged relative to the amplitude scale of waveform B. In other words, the actual reduction in square wave amplitude is much greater than that represented by the relative difference in amplitudes of the square waves of waveforms C and D.

The operational integrator circuit 40 functions to integrate the positive and negative half cycles of waveform C to produce at the output terminal 44 of integrator amplifier 41 a signal of triangular wave shape. This triangular signal is represented by the solid line waveform 112 of waveform D of FIG. 2. This triangular waveform is supplied back to the input of the Schmitt trigger circuit 20 by way of feedback conductor 48 to control the switching back and forth of the Schmitt trigger amplifier 21. The net signal appearing at the non-inverting input terminal 22 of Schmitt trigger circuit amplifier 21 is represented by waveform E of FIG. 2. It represents a summation of the triangular wave signal (waveform D) supplied thereto by way of input resistor 31 and the square wave signal (waveform B) supplied thereto by way of resistor 27. The resistance values of resistors 27 and 31 are proportioned relative to one another so that the fractions of the two signals which make up the net signal at input terminal 22 are of the proper value.

Considering the oscillator feedback mechanism in greater detail and with the aid of the waveforms of FIG. 2, it is assumed that the voltage at output terminal 23 of Schmitt trigger amplifier 21 goes positive at time $t_0$, this being the case shown in waveform A. This causes the voltage at Schmitt trigger output point 30 to go positive, as indicated by waveform B. This positive voltage at point 30 is fed back by way of resistor 27 to the non-inverting input terminal 22 of amplifier 21. This causes the voltage at amplifier input terminal 22 to make a rapid positive-going change at time $t_0$, as indicated in waveform E. This, in turn, keeps the voltage at amplifier output terminal 23 positive. In other words, the feedback from amplifier output terminal 23 by way of resistors 26 and 27 to amplifier input terminal 22 is a positive type feedback which causes a rapid switching of the amplifier 21 from a negative to a positive output voltage or vice versa.

Considering now the operational integrator circuit 40, the capacitor 47 provides a feedback path between the output terminal 44 and the inverting input terminal 42 of amplifier 41. Because of the polarity inverting action provided by amplifier 41, the feedack loop thus formed is a negative feedback loop which operates to maintain the voltage at inverting input terminal 42 substantially equal to the voltage at non-inverting input terminal 43. Since non-inverting input terminal 43 is held at a fixed value of zero volts, the negative feedback loop formed by capacitor 47 operates to maintain the inverting input terminal 42 at a voltage level of substantially zero volts. The feedback loop accomplishes this result by properly adjusting the direction and magnitude of the current flowing out of amplifier output terminal 44, through capacitor 47 and back into amplifier input terminal 42 or vice versa. If, for example, the voltage at resistor network point 54 is of positive polarity, this voltage will cause current to flow from point 54, through amplifier input resistor 45 and into amplifier input terminal 42. The feedback loop then causes current to flow out of amplifier input terminal 42, through capacitor 47 and into amplifier output terminal 44 with this current flow being equal in magnitude to the magnitude of the current flow into amplifier input terminal 42 caused by the voltage at resistor network point 54. As a consequence, there is substantially zero net current flow through the inverting circuit input impedance inside amplifier 41. Thus, the voltage level at input terminal 42 is substantially zero volts. If, on the other hand, the voltage at resistor network point 54 is of negative polarity, then the directions of the currents through input resistor 45 and feedback capacitor 47 are reversed with the net voltage at amplifier input terminal 42 again being substantially zero volts.

Just prior to time $t_0$, the voltage at resistor network point 54 (waveform C) is of negative polarity and current is flowing from amplifier output terminal 44, through feedback capacitor 47 and toward the amplifier input terminal 42. Thus, at time $t_0$ there is a positive charge on capacitor 47. By positive charge on capacitor 47 is meant that the terminal of capacitor 47 connected to amplifier output terminal 44 is positive with respect to the terminal of capacitor 47 which is connected to amplifier input terminal 42.

In this regard, it is helpful to note that amplifier input terminal 42 is maintained at a ground or zero voltage level by the feedback action. At time $t_0$, the voltage at resistor network point 54 (waveform C) reverses polarity and goes positive. This reverses the direction of current flow through the feedback capacitor 47. As a consequence, capacitor 47 is discharged and recharged in the opposite direction. This produces the downwardly sloping portion of waveform 112 of waveform D during the time interval $t_0$ to $t_1$. Since the voltage at resistor network point 54 is constant during the $t_0$ to $t_1$ interval, the current flow through capacitor 47 is also constant. Consequently, the downwardly sloping portion of waveform 112 is very linear in nature.

During the next half cycle of the square wave signal at resistor network point 54 (time interval $t_1$ to $t_2$ of waveform C), the voltage polarity at point 54 and the direction of current flow through feedback capacitor 47 are reversed. This produces the linearly rising portion of waveform 112 during time interval $t_1$ to $t_2$. This process is repetitive in character such that during each half cycle of the square wave signal at point 54, the feedback capacitor 47 is discharged and recharged in the opposite direction. This produces the triangular waveform 112 of waveform D.

During time interval $t_0$ to $t_1$, the negative-going portion of the triangular wave signal being supplied back to the input terminal 22 of Schmitt trigger amplifier 21 by way of feedback conductor 48 causes the net voltage (waveform E) at input terminal 22 to decrease in a linear manner from its initial positive value at time $t_0$ to a value of zero volts at time $t_1$. As the net signal at input terminal 22 just barely starts to go negative at time $t_1$, amplifier 21 is caused to switch over and produce a negative voltage at its output terminal 23. In other words, because of the gain of amplifier 21, a very small, almost negligible, negative voltage at input terminal 22 produces a relatively large negative voltage at output terminal 23. This negative voltage is fed back by way of resistors 26 and 27 to drive the input terminal 22 even more negative. This produces at the output terminal 23 the negative half cycle of waveform A occurring during time interval $t_1$ to $t_2$. This drives the resistor network point 54 negative which, in turn, reverses the direction of current flow through the feedback capacitor 47 in integrator circuit 40. This discharges the previous negative charge on capacitor 47 and recharges capacitor 47 in the positive direction. This recharging of capacitor 47 continues until the net input voltage (waveform E) at input terminal 22 of Schmitt trigger amplifier 21 just barely crosses the zero voltage axis at time $t_2$. At this time, the amplifier 21 switches over to again produce a positive output voltage.

The voltage level limits 113 and 114 (waveform D) for the triangular wave signal appearing at output terminal 44 of integrator circuit amplifier 41 are determined by the relative resistance values of summing circuit resistors 27 and 31 relative to one another and by the peak amplitude values of the positive and negative half cycles of the square wave signal (waveform B) appearing at Schmitt trigger circuit point 30. As previously mentioned these peak amplitude values are determined by the voltage breakover levels of the Zener diodes 28 and 29.

The triangular signal appearing at the output terminal 44 of the integrator circuit amplifier 41 is shaped into a sinusoidal signal of the same frequency by the active low-pass filter circuit 83. If the transistor 101 in switching circuit 100 is turned off or non-conductive, then the resulting sinusoidal signal at output terminal 87 of filter circuit amplifier 84 is supplied by way of capacitor 94 and resistor 96 to the tone signal output terminal 15. If, on the other hand, transistor 101 is conductive, then transistor 101 effectively shorts to ground the output terminal 15 and no tone signal is obtained at such terminal 15.

The frequency of oscillation of the oscillator formed by Schmitt trigger circuit 20, operational integrator circuit 40 and the circuit connections therebetween are dependent on the attenuation factor or voltage dividing factor existing between Schmitt trigger output point 30 and resistor network point 54, the latter being connected to the input side 45*a* of the input resistor 45 of integrator circuit 40. The smaller the attenuation factor, the larger the peak square wave voltage at point 54 and vice versa. The larger the peak voltage at point 54, the higher the frequency of oscillation and, conversely, the smaller the peak voltage at point 54, the lower the frequency of oscillation. In terms of waveforms C and D of FIG. 2, the greater the peak amplitudes of the positive and negative half cycles of the square wave signal at point 54 (waveform C), the more rapidly the integrator circuit capacitor 47 charges down to the negative level 114 and charges up to the positive level 113 and, thus, the higher the frequency of the triangular signal at integrator circuit output terminal 44. Conversely, the lower the peak amplitudes, the longer it takes the capacitor 47 to charge down to the negative level 114 and up to the positive level 113 and, thus, the lower the frequency of the triangular signal. Broken-line curve 115 of waveform D represents the case of a lower frequency triangular signal produced when the peak amplitude of the square wave signal at resistor network point 54 is reduced.

The attenuation factor of resistor network 51–56 is controlled by transistors 57 and 58 which are, in turn, controlled by the diode switching network 70 which is, in turn, controlled by the code value of the plural-bit digital signal appearing at converter input terminals 11–13. The relationship between the digital code values, the conductive conditions of transistors 57 and 58 and the frequency of oscillation of the oscillator circuit are summarized by the following table:

| Desired Tone | Digital Code | T-57 | T-58 | Osc. Freq. |
|---|---|---|---|---|
| Guard | 011 | off | off | 2150 |
| Connect | 101 | on | off | 1633 |
| Disconnect | 110 | off | on | 1336 |
| None | 111 | on | on | 1000 |
| | | | | (approx.) |

The digital code column lists the different pertinent binary signal conditions at input terminals 11–13, the left-hand digit in each entry representing the signal condition at terminal 11, the middle digit representing the signal condition at terminal 12 and the right-hand digit representing the signal condition at terminal 13. In the present embodiment, a code value of zero denotes that the corresponding terminal is at a voltage level of zero volts, while a code value of 1 denotes that the corresponding terminal is at a voltage level of +C volts. The T-57 column lists the conditions of transistor 57, while the T-58 column sets forth the corresponding conditions of transistor 58. The right-hand most column lists the different oscillator frequencies which are obtained. It is to be clearly understood that, while the foregoing relationships are particularly applicable to the present day telephone company automatic dial mobile radio telephone system, such relationships are nevertheless intended by way of example only. Other frequencies and code values can instead be used. Also, if desired the converter logic can be expanded to provide a greater number of different oscillator frequencies.

If all of the converter input terminals 11–13 are at the binary 1 or +C level, then all of diodes 71, 77, 76 and 82 are turned off. In this case, current flows from the +C supply voltage terminal, through resistor 80, diode 78 and resistor 60 to circuit ground. The resulting voltage drop across resistor 60 turns on the transistor 57. This effectively shorts to ground the lower terminal of resistor 55, thus connecting such resistor 55 in parallel with the resistor 53. This reduces the peak voltage levels at resistor network point 54, thus reducing the frequency of oscillation.

With all of the input terminals 11–13 at the +C level, current also flows from the +C supply voltage terminal, through resistor 74, diode 72 and resistor 62 to circuit ground. The resulting voltage drop across resistor 62 turns on the second transistor 58. This effectively shorts to gound the lower terminal of resistor 56 which, in effect, connects such resistor 56 in parallel with the other two resistors 53 and 55. This further reduces the peak amplitude levels at circuit point 54, which further reduces the frequency of oscillation.

When the guard tone is desired, the input terminal 11 is placed at a zero volt level and terminals 12 and 13 at the +C level. With terminal 11 at zero volts, both of diodes 71 and 77 are rendered conductive. For this condition, current flows from the +C terminal, through resistor 74 and diode 71 to terminal 11 and current also flows from the +C terminal, through resistor 80 and diode 77 to terminal 11. This drops the voltage levels at circuit points 73 and 79 to a value of practically zero volts. This disables the diodes 72 and 78 which, in turn, turns off both the transistors 58 and 57. This disconnects resistors 55 and 56 which, in turn, causes the peak amplitude levels at resistor network point 54 to assume their maximum value. This produces the maximum frequency of oscillation.

If the connect tone is desired, input terminal 12 is placed at the zero level and terminals 11 and 13 at the +C level. In this case, diode 76 is turned on and diodes 71, 77 and 82 are turned off. This reduces the voltage at circuit point 73 to a value of practically zero volts which, in turn, turns off transistor 58. At the same time, transistor 57 remains turned on because the input terminal diodes 77 and 82 which control same are non-conductive.

If the disconnect tone is desired, then input terminal 13 is placed at the zero voltage level and terminals 11 and 12 at the +C level. This turns on diode 82, diodes 71, 77 and 76 remaining non-conductive. This turns off the first transistor 57, the second transistor 58 remaining turned on.

In the initial adjustment of the converter 10, transistors 57, 58 and 101 are turned off and the sliding tap on resistor 51 is adjusted until the desired tone frequency for the guard tone is obtained at converter output terminals 15 and 16. Thereafter, transistor 57 is turned on, transistors 58 and 101 are turned off and the sliding tap on resistor 55 is adjusted to provide the desired tone frequency for the connect tone at converter output terminals 15 and 16. Similarly, with transistors 57 and 101 turned off and transistor 58 turned on, the sliding tap on resistor 56 is adjusted to provide the desired tone frequency for the disconnect tone at output terminals 15 and 16.

Switching circuit 100 functions to disable the output circuit of the converter 10 when none of the guard, connect and disconnect digital code values are being received at input terminals 11, 12 and 13. More particularly, if all of the input terminals 11–13 are at the +C level, then diodes 102, 103 and 104 are non-conductive and transistor 101 is turned on by the current flow from the +C supply voltage terminal, through resistor 106, diodes 107, 108 and 109 and the base to emitter portion of transistor 101 to circuit ground. If any one of the input terminals 11, 12 and 13 is placed at a zero voltage level, then the corresponding one of diodes 102, 103 and 104 is rendered conductive to drop the voltage at circuit point 105 below the value needed to turn on diodes 107, 108 and 109. This turns off the transistor 101 and disconnects the output terminal 15 from circuit ground. This enables the sinusoidal tone signal then being generated to appear at the converter output terminal 15.

The digital signals for the converter input terminals 11–13 can be produced in various ways. For the case of the portable radio telephone mobile unit referred to above, such signals are generated by digital logic circuitry in the mobile unit which senses the status of various conditions in the mobile unit.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A digital-to-tone converter comprising:

relaxation oscillator circuit means including level sensitive bistable circuit means, integrator circuit means and circuit means interconnecting the bistable and integrator circuit means, said bistable means and said interconnecting means forming an oscillatory feedback loop for said integration circuit means;

control circuit means coupled in the feedback loop between the bistable circuit means and the integrator circuit means and responsive to a digital input signal for controlling a circuit parameter in the feedback loop for adjusting the frequency of oscillation in accordance with the coding of the digital input signal, an output terminal;

output circuit means coupled to the oscillator circuit means for supplying an oscillatory signal to said output terminal;

and switching circuit means responsive to the digital input signal for disabling the output circuit means except during the occurrence of predetermined digital code values.

2. A digital-to-tone converter comprising:

Schmitt trigger circuit means;

integrator circuit means;

adjustable impedance means coupling the output of the Schmitt trigger circuit means to the input of the integrator circuit means;

feedback circuit means coupling the output of the integrator circuit means back to the input of the Schmitt trigger circuit means;

and control circuit means coupled to the adjustable impedance means and responsive to a digital input signal for controlling the impedance of the adjustable impedance means in accordance with the coding of the digital signal.

3. A digital-to-tone converter comprising:

a Schmitt trigger circuit;

an operational integrator circuit;

a resistor network coupling the output of the Schmitt trigger circuit to the input of the operational integrator circuit;

feedback circuit means coupling the output of the operational integrator circuit back to the input of the Schmitt trigger circuit;

a plurality of switching devices connected to the resistor network for modifying the attenuation factor between the output of the Schmitt trigger circuit and the input of the operational integrator circuit;

and a decoder network coupled to the resistor network switching devices and responsive to a digital input signal for controlling the resistor network attenuation factor in accordance with the coding of the digital input signal.

4. A digital-to-tone converter in accordance with claim 3 wherein the Schmitt trigger circuit includes:

a non-inverting amplifier having input and output terminals;

a pair of feedback resistors connected in series between the output and input terminals of the amplifier;

a pair of Zener diodes connected in series in an opposite polarity manner between a point intermediate the feedback resistors and circuit ground;

and an input resistor connecting the feedback circuit means to the input of the amplifier;

the input side of the resistor network being connected to a point intermediate the feedback resistors.

5. A digital-to-tone converter in accordance with claim 3 wherein the operational integrator circuit includes:

an inverting amplifier having input and output terminals;

a feedback capacitor connected between the amplifier output and input terminals;

and an input resistor connecting the output side of the resistor network to the amplifier input terminal;

the feedback circuit means being connected to the amplifier output terminal.

6. A digital-to-tone converter in accordance with claim 3 wherein:

the resistor network includes a plurality of series-connected resistors connected in series between the output of the Schmitt trigger circuit and circuit ground, the input of the operational integrator circuit being connected to a point intermediate two of these series-connected resistors, and the resistor network further includes a plurality of additional resistors each having one terminal thereof connected to a point intermediate two of the series-connected resistors;

and the plurality of switching devices includes a plurality of transistors each connected in series by its emitter and collector electrodes between the other terminal of a different one of the additional resistors and circuit ground, the base electrodes being connected to the decoder network.

7. A digital-to-tone converter in accordance with claim 3 wherein the decoder network is a diode switching network having a plurality of input terminals for receiving a plural-bit parallel-type digital input signal and a plurality of output terminals individually connected to different ones of the plurality of resistor network switching devices.

8. A digital-to-tone converter in accordance with claim 3 and including:

an output terminal;

filter circuit means responsive to the signal appearing at the output of the operational integrator circuit for producing a sinusoidal signal of the same frequency;

and output circuit means for supplying the sinusoidal signal to said output terminal.

9. A digital-to-tone converter in accordance with claim 8 and including switching circuit means responsive to the digital input signal for disabling the output circuit means except during the occurrence of predetermined digital code values.

10. A digital-to-tone converter in accordance with claim 3 and including:

an output terminal;

output circuit means coupled to the output of the operational integrator circuit for supplying an alternating signal to said output terminal;

and switching circuit means responsive to the digital input signal for disabling the output circuit means except during the occurrence of predetermined digital code values.

11. A digital-to-tone converter comprising:

relaxation oscillator circuit means including a Schmitt trigger circuit, an operational integrator circuit and circuit means interconnecting the Schmitt trigger circuit and the operational integrator circuit, said Schmitt trigger circuit and said interconnecting means forming an oscillatory feedback loop for said integrator circuit means;

and control in the feedback loop circuit means coupled between the Schmitt trigger circuit and the integrator circuit means and responsive to a digital input signal for controlling a circuit parameter in the feedback loop for adjusting the frequency of oscillation in accordance with the coding of the digital input signal.

12. A digital-to-tone converter comprising:

relaxation oscillator circuit means including level sensitive bistable circuit means, integrator circuit means and circuit means interconnecting the bistable and integrator circuit means, said bistable circuit means and said interconnecting means forming an oscillatory feedback loop for said integrator circuit means;

and circuit means coupled in the feedback loop between the bistable circuit means and the integrator circuit means and including a switching means and a means responsive to a digital input signal for controlling the switching means to modify a circuit parameter in the feedback loop for adjusting the frequency of oscillation in accordance with the coding of the digital input signal.

* * * * *